H. B. ANDERSON.
SIGNALING DEVICE.
APPLICATION FILED AUG. 15, 1913.
1,140,492.
Patented May 25, 1915.
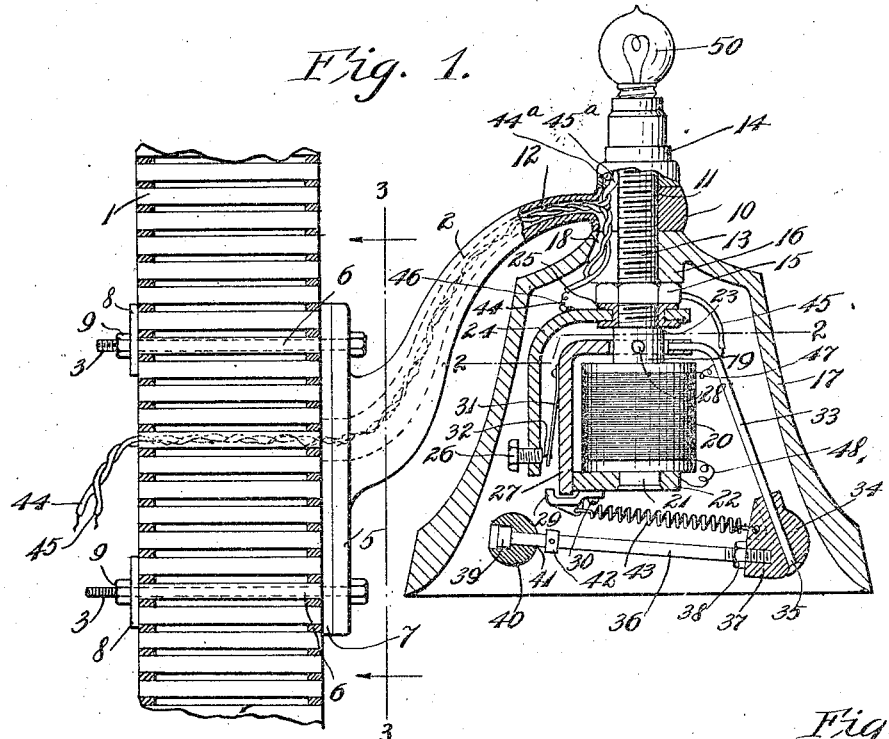
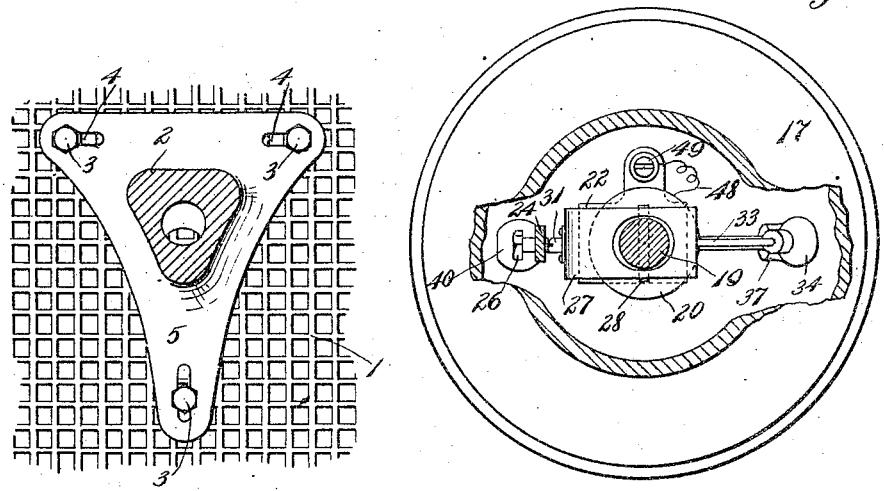
WITNESSES:
R. L. Bruck.
H. B. McGill.
INVENTOR,
Harold B. Anderson
Hull & Smith
BY
ATTYS.

UNITED STATES PATENT OFFICE.

HAROLD B. ANDERSON, OF CLEVELAND, OHIO.

SIGNALING DEVICE.

1,140,492.  Specification of Letters Patent.  Patented May 25, 1915.

Application filed August 15, 1913. Serial No. 785,006.

*To all whom it may concern:*

Be it known that I, HAROLD B. ANDERSON, a citizen of the United States, residing at Cleveland, in the county of Cuyahoga and State of Ohio, have invented a certain new and useful Improvement in Signaling Devices, of which the following is a full, clear, and exact description, reference being had to the accompanying drawings.

This invention relates, generally, to improvements in signaling devices or alarms for use on vehicles, and particularly to electrically actuated devices of this character which are especially adapted for use on automobiles for attachment to the radiators thereof. Its objects are to provide such a signaling device which is extremely efficient; substantial of construction; neat and attractive in appearance; and one which can be quickly and conveniently secured to various types of automobile radiators without injury thereto.

The high efficiency of my improved signaling device results from the employment of a pair of hammers which are actuated by a common vibrating means, the two hammers striking alternately and thereby increasing the effective vibrations. I employ a bell in my device which is of sufficient depth to contain the actuating mechanism and thus protect it, and I support this bell by a tubular bracket through which the electric wires pass, thus shielding the wires from the effects of the weather; and these features combine to render the device neat and attractive in appearance. Furthermore, the supporting plate of the bracket is slotted for the reception of bolts for securing it to the radiator, and these slots, some of which are vertically and others of which are horizontally disposed, permit an adjustment of the bolts and thereby render the device applicable to practically all styles of radiators.

My invention may be defined, generally, as consisting of the combinations of elements set forth in the annexed claims and (in its preferred embodiment) illustrated in the accompanying drawing forming a part hereof, wherein—

Figure 1 represents my improved signaling device applied to an automobile radiator of the well known "honeycomb" type, the bell being shown in central, vertical section and the section through the radiator being offset from the plane of the former section in order to show the supporting bracket partly in elevation; Fig. 2 is a sectional plan on the line 2—2 of Fig. 1; and Fig. 3 is a section on the line 3—3 of Fig. 1 and looking in the direction indicated by the arrows.

Taking up a detailed description of my invention, 1 represents a radiator of an automobile, the one shown herein being of the well known "honeycomb" type, as previously mentioned. A supporting bracket 2 is secured to the radiator by bolts 3 which pass through slots 4 in the plate 5 of the bracket, each bolt passing through one of the tubes 6 whereof the radiator is composed. A pad 7 of yielding material (such as leather) is interposed between the rear face of the plate 5 and the front of the radiator, and washers 8 of similar material are inserted between the nuts 9 and the back of the radiator. These yielding or shock absorbing devices relieve the radiator tubes 6 of undue shock or strain and thus protect the radiator against injury. The end of the bracket 2 opposite the plate 5 is provided with a head 10 having a vertical, central aperture 11 and a hole 12 extends throughout the bracket from the inner face of the plate 5 to the aperture 11, the purpose of which will hereinafter be explained.

Adapted to pass freely through the aperture 11 in the head 10 of the bracket 2 is the threaded end of a post 13. This post is supported by a combination nut and lamp socket 14 which bears upon the upper surface of the head 10, and located upon the post 13 and firmly clamped between the underneath surface of the head 10 and the nut 15, which is also threaded upon the post, is the sleeve 16 of the bell 17. The sleeve 16 is cut away at one point to form a channel 18 which is adapted to register with the outer end of the aforesaid hole 12 in the bracket.

The post 13 is preferably made of comparatively soft iron and its lower end portion is of greater diameter than the upper threaded part, and this enlarged portion provides a core 19 for an electromagnet coil 20, the extreme lower end of the core being reduced at 21 where it passes through a hole in the core plate 22 and is then riveted to firmly secure the core plate to the core 19.

The difference in diameter of the core 19 and the threaded portion of the post 13 provides a shoulder 23, and between this shoulder and the underneath face of the nut 15 is firmly clamped an angle arm 24, said arm being insulated from the post and nut by insulating material 25 in a manner common to this class of work. The free end of the angle arm 24 extends down along side the coil 20 of the electromagnet and carries, at its lower end, a screw 26. The L-shaped armature 27 of the electromagnet has its horizontal branch pivoted upon a pin 28 which extends through the core 19 a slight distance above the upper end of the coil 20, and its other branch extends down between the side of the coil and the aforesaid arm 24 where its lower end is adapted to be attracted by the core plate 22. A keeper 29 which is secured to the core plate by a screw 30 limits the movement of the armature in a direction away from the core plate. A spring 31 is carried by the vertical branch of the armature and its lower free end is adapted to engage the platinum or silver point 32 of the screw 26.

The upper end of a spring stem 33 is secured, preferably by a "drive-fit", to the free end of the horizontal branch of the armature 27 and this stem 33 extends downwardly within a short distance of the lower edge of the bell and substantially parallel with the side thereof and carries at its lower end a hammer 34. The angle between the inwardly directed upper end of the stem 33 and its main portion is such as will support the hammer 34 a slight distance from the surface of the bell when the lower end of the armature 27 is in contact with the core plate 22, in which position it is shown in the drawing. In connecting the hammer 34 to the stem 33, the stem is driven through the bore in the hammer and riveted at 35. A rod 36 which is threaded into a boss 37 projecting from the side of the hammer 34 and which is adapted to be locked in a properly adjustable position by a nut 38, extends from said hammer in a substantially horizontal direction across the bell to within a short distance of its other side where the rod is provided with a head 39. An auxiliary hammer 40 which is preferably spherical in shape and which is provided with an axial bore 41 (a portion whereof is of the diameter of the body portion of the rod 36 and the other part of slightly greater diameter than the head of the rod) is placed upon the rod before the rod is secured to the hammer 34, and a collar 42 which is pinned to the rod and spaced from its head 39 a distance slightly greater than the length of the smaller portion of the bore 41, limits the movement of the auxiliary hammer 40 as it slides upon the end of the rod. A spring 43 connects the hammer 34 with the stationary keeper 29 carried by the core plate of the magnet and tends to rock the structure comprising the armature and the hammers with their respective stems, upon the pivot pin 28 to separate the lower end of the armature from the core plate 22. When the magnet is deënergized and the spring 43 permitted to act according to the above, the lower end of the armature 27 will be swung away from the core and against the outer end of the keeper 29, when the head 39 of the rod 36 will be projected toward the side of the bell 17 a sufficient distance to cause the hammer 40 to touch said bell, assuming, of course, that the auxiliary hammer 40 is, by such action, thrown to the extreme outer limit of its movement upon the rod 36.

Current is supplied to the coil 20 of the electromagnet through the wires 44 and 45, the former of which is attached to the angle arm 24 (as by soldering as shown at 46) the latter wire 45 having connection with one end of the coil of the electromagnet as shown at 47. The opposite end of the coil is connected by a wire 48 to a binding post 49 which is located on an extension to the core plate 22. Any suitable means may be provided for supplying electric current to the wires 44—45, and the circuit may include any form of switch, preferably a push button which may be located in easy reach of the driver, as for instance, upon the steering wheel. When the circuit is closed by such device, current will be introduced into the electromagnet from the wire 44 to the angle arm 24, and from here it will flow through the screw 26, the spring 31 to the armature 27, through the pin 28, the core 19, core plate 22, binding post 49, wire 48, to the coil 20 of the electromagnet, returning through the wire 45 to the source of power. The electromagnet, being thus energized, will attract the armature 27, causing it to rock upon its pivot pin 28 and swing the hammer 34 against the side of the bell.

The resiliency of the stem 33 is sufficient to cause the hammer to bridge the gap which normally exists between such hammer and the adjacent surface of the bell; and because of its quick recoil, the hammer 34 will offer no interference with its clear vibrations. Immediately upon the swinging of the armature 27 against the core plate 22, the connection is broken between the screw 26 and the spring 31 thereby breaking the circuit and deënergizing the magnet. Upon the magnet being so deënergized, the spring 43 retracts the hammer 34 and causes it, through the rod 36, to project the auxiliary hammer 40 with considerable force against the opposite side of the bell. The recoil resulting from the impact of the auxiliary hammer against the bell causes such hammer to slide backwardly upon the rod into engagement with the collar 42, and being removed from the zone of vibration of the bell, the hammer in no way interferes with the clear sounding thereof. Under the conditions which permit the spring 43 to actuate the hammers, the armature 27 is back against the keeper 29, and in such position throws the lower end of the spring 31 against the screw 26 and restores the circuit to cause the repetition of the foregoing operation.

To protect the wires 44—45 from the weather and to promote the neat and attractive appearance of my device, I prefer to lead the wires through one of the radiator tubes 6, through an aperture in the pad 7 and through the hole 12 in the bracket 2. Adjacent the aperture 11 in the head 10 of the bracket, the wires 44—45 are directed downwardly through the channel 18 in the sleeve 16 of the bell 17 to the interior of the bell; and at this same point I lead off a pair of branch wires 44$^a$—45$^a$ from the respective wires 44 and 45, and these have connection with the socket which forms a part of the nut 14. Supported by the socket is an electric lamp 50 (which is preferably red as such color is the conventional indication of danger). In this manner I place in multiple with the sounding alarm, an electric lighting signal which is illuminated simultaneously with the sounding of the alarm.

From the foregoing description it will be seen that I have provided a signaling device for automobiles which is very compact and which, while involving an electrically actuated vibrating means of ordinary principle, has its efficiency materially increased by a novel construction of hammer, and the method of conducting the wires through the hollow supporting bracket of the bell is also an important feature of my invention.

The manner in which I secure the supporting bracket to the radiator whereby the radiator is relieved of shock or strain and the adaptability of the bracket to various types of radiators through the adjustment provided by the slots 4 in the plate 5, are also points of importance.

Having thus described my invention, what I claim is:—

1. A device of the character set forth comprising, in combination, a sound producing element, a principal hammer which is adapted to be swung thereagainst, and an auxiliary hammer adjustably carried by the principal hammer and adapted to be swung against the sound producing element upon the recoil of the principal hammer.

2. A device of the character set forth comprising, in combination, a sound producing element, a principal hammer which is adapted to be swung thereagainst, an auxiliary hammer carried by the principal hammer and adapted to be swung against the sound producing element upon the recoil of the principal hammer, said auxiliary hammer being movable to and from the principal hammer, and means for swinging the principal hammer.

3. A device of the character set forth comprising, in combination, a sound producing element, a principal hammer which is adapted to be swung thereagainst, an auxiliary hammer carried by the principal hammer and adapted to be swung against the sound producing element upon the recoil of the principal hammer, said auxiliary hammer being movable to and from the principal hammer, means for adjusting the extent of movement of the former from the latter, and means for swinging the hammers.

4. A device of the character set forth comprising, in combination, a sound producing element, a principal hammer having a flexible stem and adapted to be swung against the sound producing element, a rod carried by the principal hammer, and an auxiliary hammer supported by the end of the rod remote from the principal hammer and adapted to be swung against the sound producing element upon the recoil of the principal hammer.

5. A device of the character set forth comprising, in combination, a sound producing element, a principal hammer having a flexible stem and adapted to be swung against the sound producing element, a rod carried by the principal hammer and adjustable with respect thereto, and an auxiliary hammer supported by the end of the rod remote from the principal hammer and adapted to be swung against the sound producing element upon the recoil of the principal hammer.

6. A device of the character set forth comprising, in combination, a sound producing element, a principal hammer having a flexible stem and adapted to be swung against the sound producing element, a rod carried by the principal hammer, an auxiliary hammer supported by the end of the rod remote from the principal hammer and adapted to be swung against the sound producing element upon the recoil of the principal hammer, and means for vibrating the stem of the principal hammer.

7. A device of the character set forth comprising, in combination, a sound producing element, a principal hammer having a flexible stem and adapted to be swung against the sound producing element, a rod carried by the principal hammer and adjustable with respect thereto, an auxiliary hammer supported by the end of the rod remote from the principal hammer and adapted to be swung against the sound producing element upon the recoil of the principal hammer, and means for vibrating the stem of the principal hammer.

8. A device of the character set forth comprising, in combination, a sound producing element, a principal hammer having a flexible stem and adapted to be swung against the sound producing element, a rod carried by the principal hammer, and an auxiliary hammer movably carried by the end of the rod remote from the principal hammer and which is adapted to be swung against the sound producing element upon the recoil of the principal hammer.

9. A device of the character set forth comprising, in combination, a sound producing element, a principal hammer having a flexible stem and adapted to be swung against the sound producing element, a rod carried by the principal hammer, an auxiliary hammer movably carried by the end of the rod remote from the principal hammer and which is adapted to be swung against the sound producing element upon the recoil of the principal hammer, and means for vibrating the stem of the principal hammer.

10. A device of the character set forth comprising, in combination, a sound producing element, a principal hammer having a flexible stem and adapted to be swung against the sound producing element, a rod carried by the principal hammer, an auxiliary hammer movably carried by the end of the rod remote from the principal hammer and which is adapted to be swung against the sound producing element upon the recoil of the principal hammer, means consisting of an electromagnet for swinging the stem of the principal hammer in a direction to cause it to strike the sound producing element, and a spring for moving the principal hammer in the opposite direction and causing an impact of the auxiliary hammer against the sound producing element.

11. A device of the character set forth comprising, in combination, a sound producing element, a principal hammer having a flexible stem and adapted to be swung against the sound producing element, a rod carried by the principal hammer, means for adjusting said rod with respect to said hammer, an auxiliary hammer movably carried by the end of the rod remote from the principal hammer and which is adapted to be swung against the sound producing element upon the recoil of the principal hammer, means consisting of an electromagnet for swinging the stem of the principal hammer in a direction to cause it to strike the sound producing element, and a spring for moving the principal hammer in the opposite direction and causing an impact of the auxiliary hammer against the sound producing element.

In testimony whereof, I hereunto affix my signature in the presence of two witnesses.

HAROLD B. ANDERSON.

Witnesses:
BRENNAN B. WEST,
HUGH B. McGILL.